Figure 1:
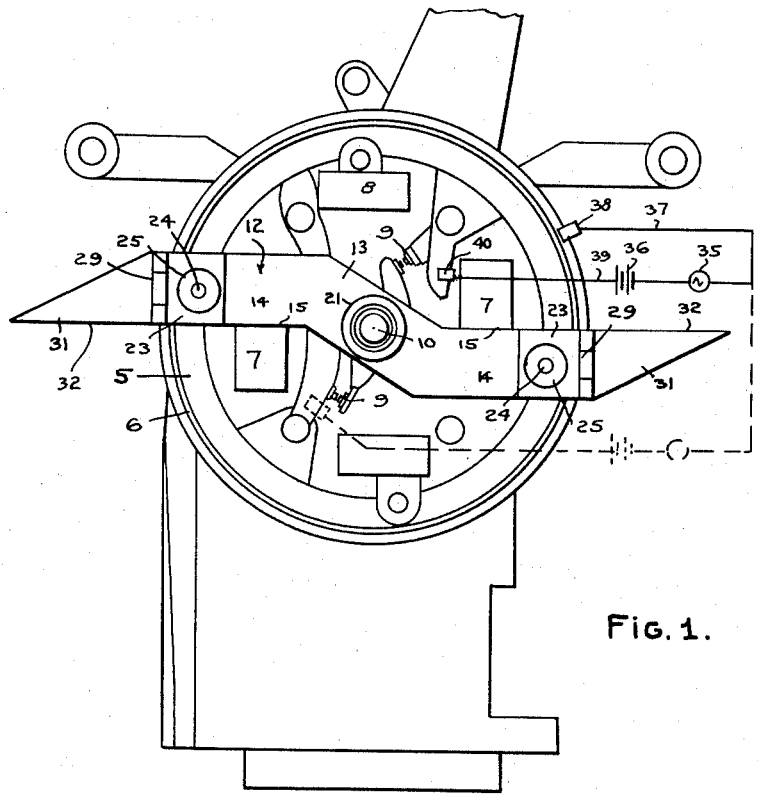

Nov. 3, 1959  M. T. ANDERSON  2,910,958
TIMING INDICATOR FOR OUTBOARD MOTORS
Filed June 11, 1957  2 Sheets-Sheet 1

INVENTOR.
MARTIN T. ANDERSON,
BY
ATTORNEY

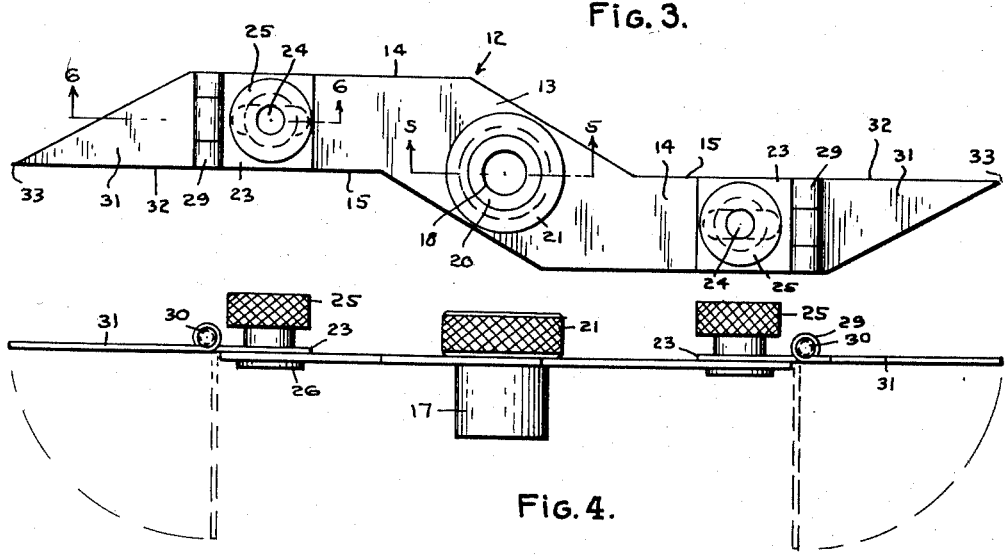
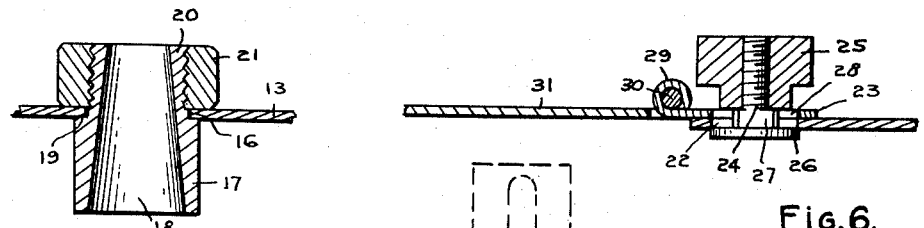
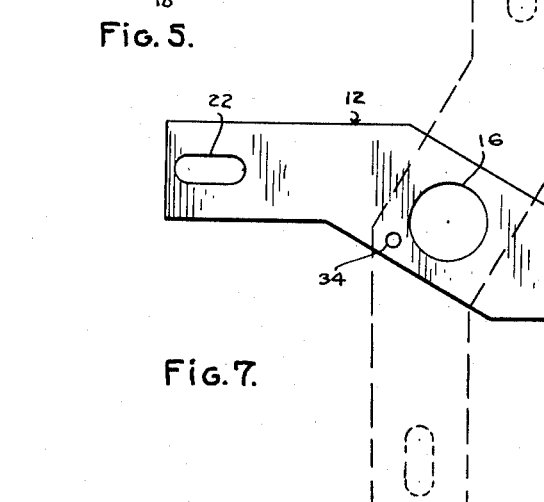

United States Patent Office

2,910,958
Patented Nov. 3, 1959

2,910,958

TIMING INDICATOR FOR OUTBOARD MOTORS

Martin T. Anderson, Hope Valley, R.I.

Application June 11, 1957, Serial No. 665,028

4 Claims. (Cl. 116—124)

This invention relates to means to facilitate the accurate time of firing for outboard motors of the gasoline powered type.

The invention contemplates a gauge device that is disposed over the well known tapered end of the crank shaft and whereby to serve as a point locating means, preferably upon the circumferential edge of the stator plate of the motor.

The device of the present invention embodies a relatively simple gauge plate having hinged pointers at its opposite ends and with the pointers terminating in sharp points and with the points at the opposite ends being in perfect alignment and in alignment with the axial center line of the motor crank shaft.

The invention further contemplates a novel form of taper socket that is disposed within an opening of the gauge plate to be clamped thereto and to form a taper socket for seating engagement with the upper end of the crank shaft and with the taper socket being removable for substitution by a taper socket having a different diameter and whereby the gauge device is adaptable to outboard motors of various manufacture.

A further object of the invention resides in hinged pointer devices that are swingable in a vertical plane after installation of the gauge plate and whereby the pointer devices will overlie the outer circumferential side of the stator plate to indicate a point of marking of the stator plate and with the pointer devices being longitudinally adjustable whereby the gauge device further accommodates itself to stator plates having varying diameters.

Novel features of construction and operation of the device and a method whereby the timing is determined will be more clearly apparent during the course of the following description, reference being had to the accompanying drawings wherein has been illustrated a preferred form of the device and wherein like characters of reference are employed to denote like parts throughout the several figures.

Figure 2:
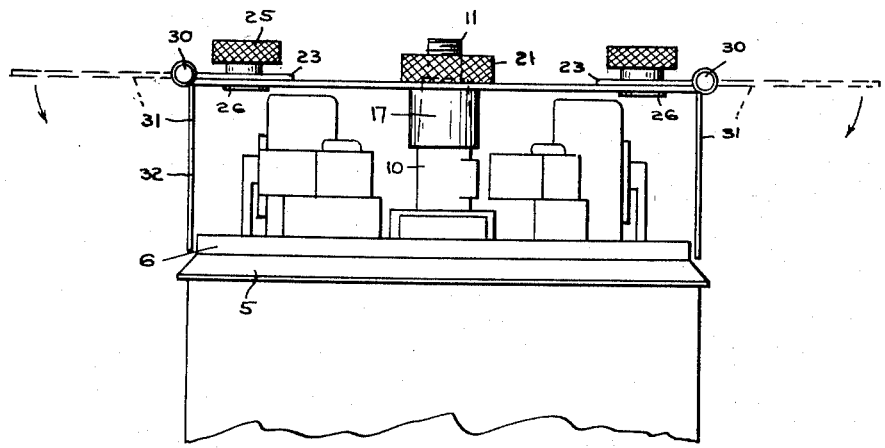

In the drawings:

Figures 1 is a fragmentary top plan view of an outboard motor having its cover removed and illustrating the gauge plate in operative position, Figure 2 is a side view thereof, Figure 3 is an enlarged top plan view of the gauge plate, Figure 4 is a side elevation thereof, Figure 5 is a longitudinal section taken substantially on line 5—5 of Figure 3, Figure 6 is a longitudinal section taken substantially on line 6—6 of Figure 3, and Figure 7 is a modified form of gauge plate illustrating a connecting opening for a second gauge plate to be disposed at a right angle and whereby to accommodate motors having four cylinders.

Referring specifically to the drawings and particularly to Figures 1 and 2, the numeral 5 designates a conventional stator plate embodied within the head portion of an outboard motor. The stator plate 5, ordinarily is provided with a circumferential flange 6. The stator plate supports the usual coils 7, condensers 8 and conventional breaker points 9. No attempt has been made to illustrate the breaker points and associated mechanism in detail, since they are of well known construction. The coils etc. are normally covered by a casing or fly wheel, not shown and whereby the mechanism is protected against water or the like. The fly wheel is supported upon and normally splined to the upper extended end of the crank shaft 10. The crank shaft, as is well known, has a tapered upper portion and an extended threaded end 11 whereby the fly wheel is securely clamped in position to rotate with the crank shaft.

The gauge device of this invention embodies a flat metallic plate, indicated as a whole by the numeral 12. The plate is provided with an intermediate angular portion 13 terminating in laterally off-set tongues 14. The tongues 14 have a straight edge 15 and with the edges 15 being in perfect alignment and in alignment with the axial center of a cylindrical opening 16 formed in the plate section 13. The gauge plate 12 is preferably formed of brass or a similar material having a high resistance to corrosion.

Clamped within the opening 16 is a taper socket 17, having a taper opening 18 extending throughout its height. The socket 17 is shouldered at 19 for engagement with the underside of the plate 13. The socket 17 is provided with a concentric upper extension 20 that is externally threaded for the reception of a preferably knurled clamping nut 21 and through the medium of which the taper socket can be rigidly clamped to the plate. The taper socket 17 constitutes the centering means for the gauge plate 12 upon the upper tapered end of the crank shaft 10. The taper socket 17 may be replaced as desired for use with outboard motors whose crank shaft is either larger or smaller and possibly having a different taper, thus making the gauge device applicable for the major number of outboard motors presently in use.

Each of the tongues 14, adjacent their outer ends are longitudinally slotted at 22 for purpose to be presently described. Connected at the terminal ends at each of the tongues 14, are hinge plates 23. The hinge plates are adjustably connected to the tongues 14 through the medium of a clamping screw 24 and a clamping nut 25. The clamping screw 24 is provided with an enlarged lower head portion 26 and an elongated shoulder 27 and with the shoulder jointly engaging within the slot 22 and a slot 28 formed in the hinge plate and whereby the hinge plate is adjustable longitudinally of the tongues 14 and maintained in accurate alignment by the shoulder 27. Hingedly connected to the outer ends of the hinge plates 23, as by knuckles 29 and hinge pins 30, is a triangular pointer 31. The pointers 31 have one straight edge 32 that is in accurate alignment with the edges 15 of the tongues 14, thus accurately disposing the edges 32 along the axial center line of the socket 17 and obviously the axial center line of the crank shaft 10 to which the device is applicable. Each of the pointers 31 terminate in relatively sharp points 33, such points constituting the gauge points and a point of marking upon the flange 6 of the stator plate 5.

In Figure 7, there has been illustrated a slightly modified form of gauge plate, wherein the gauge plate 12 is substantially identical to that previously described. It becomes necessary at times to employ the gauge plate for the proper timing of outboard motors having four cylinders instead of two and to accomplish this, two gauge plates 12 are employed and, as illustrated in dotted lines, the second gauge plate 12a is arranged at a right angle to the gauge plate 12. In order to accurately position the gauge plate 12a with respect to the gauge plate 12, the gauge plate 12 has been provided with a relatively small aperture 34, while the gauge plate 12a will be provided with a pin, not shown, that engages the aperture 34 and whereby the gauge plate 12a may be disposed in overlying relation to the gauge plate 12 and positively positioned at a right angle thereto. In all other respects, the gauge plates and their pointers are identical to that previously described. The gauge plates 12 and 12a are clamped together by the taper socket 17 and the nut 21.

In the use of the device, when it is desired to accurately time the firing of an outboard motor having a pair of cylinders, a suitable depth gauge is inserted through the spark plug openings of the cylinders, one at a time to determine the maximum firing position of the pistons. With the first piston being accurately positioned as to its point of firing, it now becomes necessary to adjust the points of the brakers. It is desirable that the points be set by a visual means, such as a lamp 35, see Figure 1 and a source of electrical energy 36. While the electrical circuit for the testing of the motor is diagrammatically illustrated, it will be apparent that any desirable means may be employed, such as a conventional flash light that is provided with a ground wire 37 having a clip wire 38. The lamp 35 is connected to one side of the source of current 36 and to the clip 38. From the opposite side of the source of current, a conductor 39 is provided with a clip 40. Now, the clip 40 is connected to the braker assembly for one cylinder while the clip 38 is connected at any point to the stator plate 5. The points are then adjusted so that the lamp barely begins to glow. The gauge plate 12 is then positioned upon the tapered end of the crank shaft 10 and the pointers 31 swung downwardly to be closely adjacent to the flange 6 of the stator plate. The stator plate is then marked by a suitable instrument at one side. When the lamp 35 begins to glow, the points are properly set for the accurate firing position for that particular cylinder. The propeller shaft is then turned to a point where the depth gauge indicates the proper firing position, and the rotation of the crank shaft under the influence of the propeller shaft also rotates the gauge device 12, carrying the opposite pointer 31 to the point previously occupied by the pointer that has served to indicate a point of marking. When the second pointer device is in accurate registry with the marking made upon the flange 6, the clip 40 is then engaged with the opposite points 9 and the operator proceeds then to adjust the points until the lamp 35 just begins to glow, at which time the points have been accurately adjusted so that the firing order and the point of firing will be identical at each revolution of the crank shaft. The operator can thus very accurately time the firing for the cylinders. In any event, it becomes necessary to first accurately determine the position of firing for the piston and it is contemplated that a suitable depth gauge having calibrated markings shall be employed, such a depth gauge to be presented in a separate application for patent. The depth gauge will have a threaded end that engages the threads of the spark plug openings.

It will be apparent from the foregoing that a very simple and accurate gauge device has been provided and whereby to definitely determine the degree of rotation necessary to set the braker points for the proper firing sequence of the cylinders. The device is economical to manufacture and is highly effective and greatly simplifies the timing of outboard motors, and especially outboard motors of the racing type.

It is to be understood that the invention is not limited to the precise construction shown, but that changes are contemplated as readily fall within the spirit of the invention as shall be determined by the scope of the subjoined claims.

Having described my invention, what I claim as new and desire to secure by Letters Patent is:

1. A gauge device for use in setting the ignition points of an outboard motor having a projecting tapered crankshaft, that comprises a gauge plate that is provided intermediate its ends with a tapered socket, that has seating engagement with the tapered end of the crankshaft and whereby the gauge plate may be disposed in overlying relation to a stator plate of the motor for substantially its full diameter, the plate at its opposite ends carrying hingedly connected pointers that are swingable downwardly to a position where the ends of the pointers are disposed closely adjacent to a circumferential flange formed upon the stator plate, one pointer functioning as a gauge for marking upon the flange for an initial adjustment of one pair of ignition points, the gauge plate and its pointers being rotatable with the crankshaft to dispose the opposite pointer in register with the marking upon the flange for the adjustment of a second pair of contact points, the said pointers and the marking serving to indicate a complete revolution of the crankshaft.

2. A gauge device for accurately determining a complete revolution of the crankshaft of an outboard motor and whereby the complete revolution determines the point for adjusting ignition points, the stator plate and associated points being uncovered and with a tapered upper end of the cranshaft being exposed, the gauge device comprising a flat gauge plate having an intermediate angular portion carrying offset tongues, the intermediate portion being centrally apertured, the tongues each having a straight edge and with the straight edges being in alignment with each other and in alignment with the axial center of the aperture, a taper socket detachably clamped into engagement with the aperture axially thereof, the taper socket adapted to have a seating engagement with the tapered end of the crankshaft and whereby the gauge plate is supported in overlying relation to the stator plate, pointers hingedly connected to the ends of each tongue and with each pointer having a straight edge that is in alignment with the straight edges of the tongue, the pointers being folded downwardly to indicate a point for marking a circumferential flange of the stator plate, the point of marking indicating a maximum firing point for one cylinder of the motor and to indicate the point for setting the ignition points, the gauge plate and associated pointers being rotatable with the crankshaft when the crankshaft is manually rotated to position an opposite pointer in registry with the marking on the flange to indicate a complete rotation of the crankshaft and to indicate the point for setting the ignition points for a second cylinder.

3. The gauge plate according to claim 2, wherein the hingedly connected pointers are longitudinally adjustable with respect to the gauges and whereby the gauge and its pointers are variable to span the diameter of various stator plates and their flanges, the pointers when swung upward adapted to be in a plane whereby to form a clearance with parts of the outboard motor when the crankshaft is rotated.

4. The gauge plate according to claim 2, wherein the pointers are hingedly connected to a hinge plate that overlies the end portion of each tongue and that is coextensive in width, the hinge plates and the end portions of each tongue being longitudinally slotted and a threaded clamping bolt passing through the slots for engagement with a clamping nut and whereby the hinge plates and their connected pointers may be longitudinally adjusted and maintained in alignment.

References Cited in the file of this patent

UNITED STATES PATENTS

| | | |
|---|---|---|
| 2,119,206 | Frisz | May 31, 1938 |
| 2,441,782 | Wass et al. | May 18, 1948 |